(12) United States Patent
McNulty et al.

(10) Patent No.: US 6,275,403 B1
(45) Date of Patent: Aug. 14, 2001

(54) BIAS CONTROLLED DC TO AC CONVERTER AND SYSTEMS

(75) Inventors: Thomas C. McNulty, Trenton; Douglas B. Williams, Florence, both of NJ (US)

(73) Assignee: WorldWater Corporation, Pennington, NJ (US)

(*) Notice: Subject to any disclaimer, the term of this patent is extended or adjusted under 35 U.S.C. 154(b) by 0 days.

(21) Appl. No.: 09/224,537

(22) Filed: Dec. 31, 1998

(51) Int. Cl.[7] .............................. H02M 7/537; H02M 3/24
(52) U.S. Cl. ................................. 363/131; 363/98
(58) Field of Search ..................... 363/131, 132, 363/41, 98, 97, 78, 49, 56; 323/285

(56) References Cited

U.S. PATENT DOCUMENTS

| | | | |
|---|---|---|---|
| 4,872,100 | * | 10/1989 | Diaz ........................................ 363/41 |
| 4,939,633 | * | 7/1990 | Rhodes et al. .......................... 363/98 |
| 5,798,633 | * | 8/1998 | Larsen et al. ......................... 323/207 |

* cited by examiner

Primary Examiner—Rajnikant D. Patel
(74) Attorney, Agent, or Firm—Henry P. Sartorio

(57) ABSTRACT

It is difficult to control a variable speed converter or inverter so that an AC motor or other load may be operated from a DC source under varying source and/or load conditions. A DC bias voltage control related to AC frequency by a predetermined relationship is used to control the DC to AC converter. For variable speed AC converters, a low voltage bias control circuit is effectively used to control motor frequency by applying a bias voltage to the converter so that the load requirements are optimally met by the available DC source voltage. The controller can be used in many DC source—bias controlled converter—AC load systems formed with the bias controlled drive, for example a solar powered water pump in which a DC photovoltaic panel is used to power an AC pump motor.

20 Claims, 7 Drawing Sheets

BIAS CONTROLLED DC TO AC CONVERTER AND SYSTEMS

BACKGROUND OF THE INVENTION

1. Field of the Invention

The present invention relates generally to AC motor drives which convert DC to AC, and more specifically to the drive for an AC motor which will drive a pump or other active loads. A particular application is to solar water pumping systems; however, this invention is not restricted to solar systems but to any varying DC power source for the purpose of controlling AC motor systems or other loads.

2. Description of the Prior Art

An AC load can be powered from a DC source by using a converter to change DC to AC. However, because of changes in both the source and the load, it can be difficult to meet the power requirements of the load. For example, a photovoltaic solar cell array is a DC source. However, the current-voltage curve shifts under varying conditions, e.g. amount of sun. Thus at a constant voltage, the amount of current that can be drawn will vary. One application of solar power is to operate water pumps. Standard water pumps are three phase AC pumps. However, the load curve of the AC pump motor also shifts with varying conditions, e.g. water depth. Thus it can be difficult to efficiently operate an AC pump from a solar array.

Many systems that control motor drives operate on a fixed frequency and attempt to maintain a fixed DC voltage. However, attempting to operate at fixed frequency requires a constant power to the motor drive. This can take form in an elaborate DC constant voltage system or some type of DC storage systems such as a battery. For a fixed frequency at constant power the system requires a constant current-voltage relationship. This system can be quite elaborate and often times expensive for an efficiently controlled system.

Controlling motors at a fixed frequency is very demanding on the DC source voltage. If the power is to remain constant at a given frequency, then a change in DC voltage must be accompanied by a change in DC current. If the voltage decreases, the current must increase which results in a further voltage decrease until a point is reached where a shutdown must occur to prevent motor damage or increased heat or other related damage.

In general, it is desirable to operate at the maximum power point on a power curve. However, it is difficult to track power. Therefore, it is desirable to find a simpler method and apparatus to control a variable speed converter or motor drive so that an AC motor or other load may be operated from a DC source under varying source and/or load conditions.

SUMMARY OF THE INVENTION

Accordingly it is an object of the invention to provide a method and apparatus to control a variable speed converter or motor drive so that an AC motor or other load may be operated from a DC source under varying source and/or load conditions.

It is another object of the invention to provide systems which utilize the new method and apparatus to control the converter/motor drive, including solar powered water pumping systems.

The invention is a control apparatus and method for a DC to AC converter, in which a DC bias voltage control is related to AC frequency by a predetermined relationship. For variable speed AC motor drives, a low voltage bias control circuit is effectively used to control motor frequency by applying a bias voltage to the converter so that the load requirements are optimally met by the available DC source voltage. The invention also includes the DC source—bias controlled converter—AC load systems formed with the bias controlled drive, for example a solar powered water pump in which a DC photovoltaic panel is used to power and AC pump motor.

A DC source is connected through a DC to AC converter or motor drive to an AC load. The converter/motor drive may be a conventional programmable variable speed drive, and includes a pulse width modulator (PWM) for changing the frequency of the AC output. A bias control circuit according to the invention operates on the DC source voltage and is connected to the PWM of the motor drive to apply a bias voltage. An optional shut off circuit which also operates on the DC source voltage is also connected to the PWM. In a particular embodiment, the DC source is a solar array and the AC load is a water pump motor.

Basically the invention operates on a fixed frequency slope which is the predetermined relationship of bias voltage to frequency. The position on the curve is a function of the source voltage so that the system allows for changing source voltage. The system operates on a source voltage bandwidth (discrete voltage steps) and adjusts the frequency of the AC output as a function of that voltage bandwidth. This results in reduced frequency hunting for a given voltage change, adjusting the voltage from the source to maintain a more constant source power. The creation of voltage steps allows a different function of frequency vs. source voltage for different voltage levels, searching for a constant and maximum power for the drive. Although the invention is not based on a maximum power point strategy, the point that it seeks is a maximum power point.

DETAILED DESCRIPTION OF THE INVENTION

This invention relates to a different control apparatus and method for a DC to AC converter, in which a DC voltage control is related to AC frequency by a predetermined relationship. For variable speed AC motor drives, a low voltage bias control circuit is effectively used to control motor frequency by applying a bias voltage to the converter so that the load requirements are optimally met by the available DC source voltage.

Figure 1:
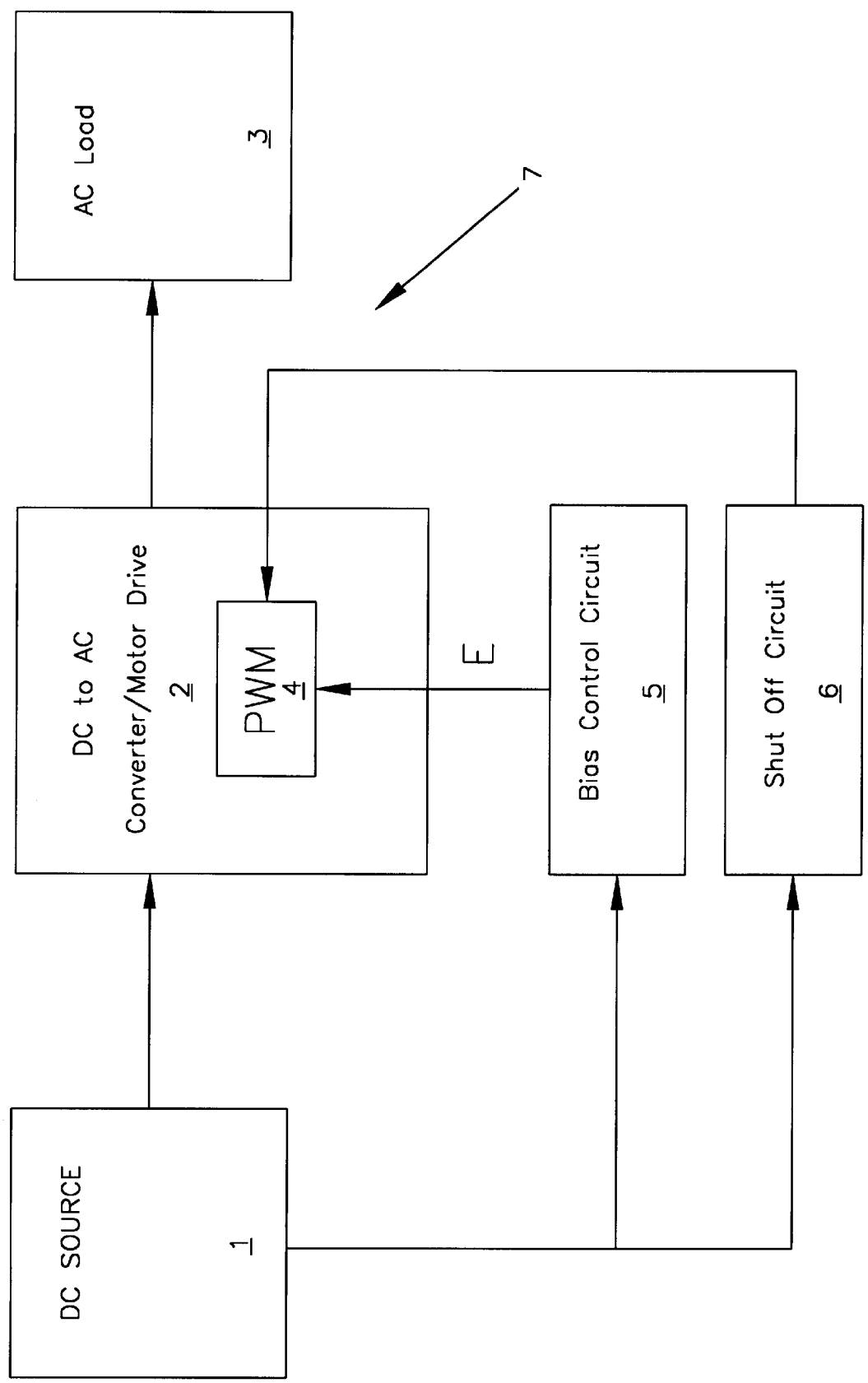
FIG. 1 is a schematic block diagram of a system with a motor drive controlled by a bias control circuit.

A system 7 according to the invention has a DC source 1 connected through DC to AC converter or motor drive 2 to AC load 3, as shown in FIG. 1. Converter/motor drive 2 may be a conventional programmable variable speed drive, and includes a pulse width modulator (PWM) 4 for changing the frequency of the AC output. Converter 2 is, in general, any DC to AC converter. If the load 3 is a motor, converter 2 is referred to as a motor drive. Some types of DC to AC converters are referred to as inverters. A bias control circuit 5 according to the invention operates on the DC source voltage $V_S$ and is connected to the PWM 4 of motor drive 2 to apply a bias voltage E. An optional shut off circuit 6 which also operates on the DC source voltage is also connected to PWM 4. In a particular embodiment, DC source 1 is a solar array and AC load 3 is a water pump motor.

Figure 2:
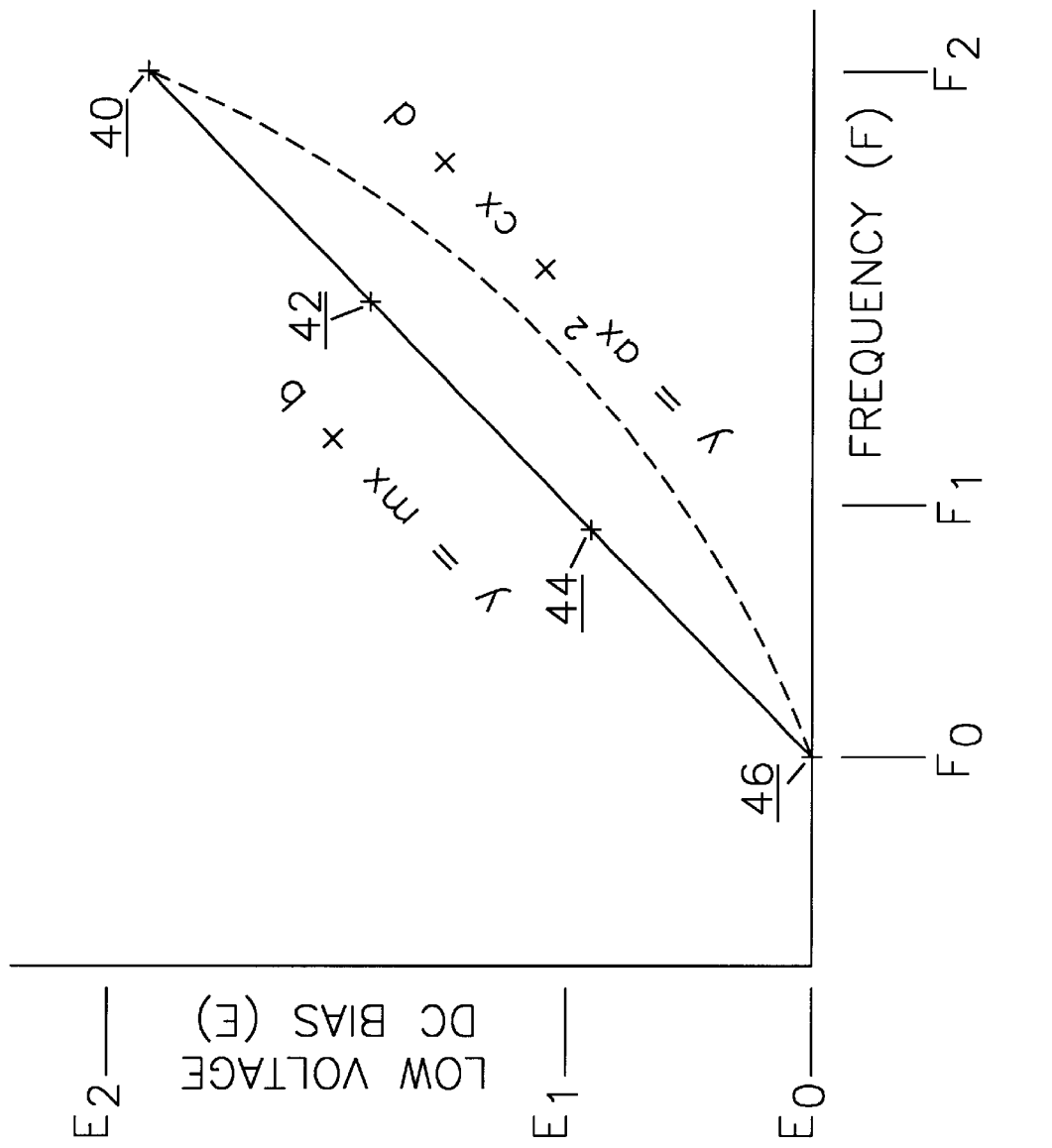
FIG. 2 is a graph of bias voltage vs. frequency.

By applying a DC bias voltage to the motor drive, a relationship exists which can be described by the straight line equation y=mx+b as shown in FIG. 2, where the x coordinate is the frequency F of the AC signal produced by the DC to AC converter and supplied to the AC motor and the y coordinate is the bias voltage E applied to a pulse width modulator in the converter to vary F. For example, the above curve describes a frequency "$F_0$" when the bias voltage is $E_0$. This can be the minimum desired frequency as determined by the operational requirements of the particular motor. For bias voltage $E_2$, then a frequency $F_2$ is obtained which can be the maximum frequency as determined by the operational requirements of the motor. The range $E_0$ to $E_2$ is determined by the controller circuitry, e.g. 0 to 10V. The range $F_0$ to $F_2$ is determined by the motor, e.g. 20 Hz to 65 Hz for a water pump. By operating on the curve, different frequencies, e.g. $F_1$, can be obtained by varying the DC bias voltage, e.g. $E_1$. An acceptable min-max frequency is generated through empirical data, and this data is then described in a curve of bias voltage versus frequency. Various slopes can be generated by the straight-line equation y=mx+b which can be used to set minimum and maximum motor frequency. While the simplest situation is a linear curve, the principles of the invention also apply to a nonlinear curve $y=ax^2+cx+d$ as also shown in FIG. 2.

Figure 3:
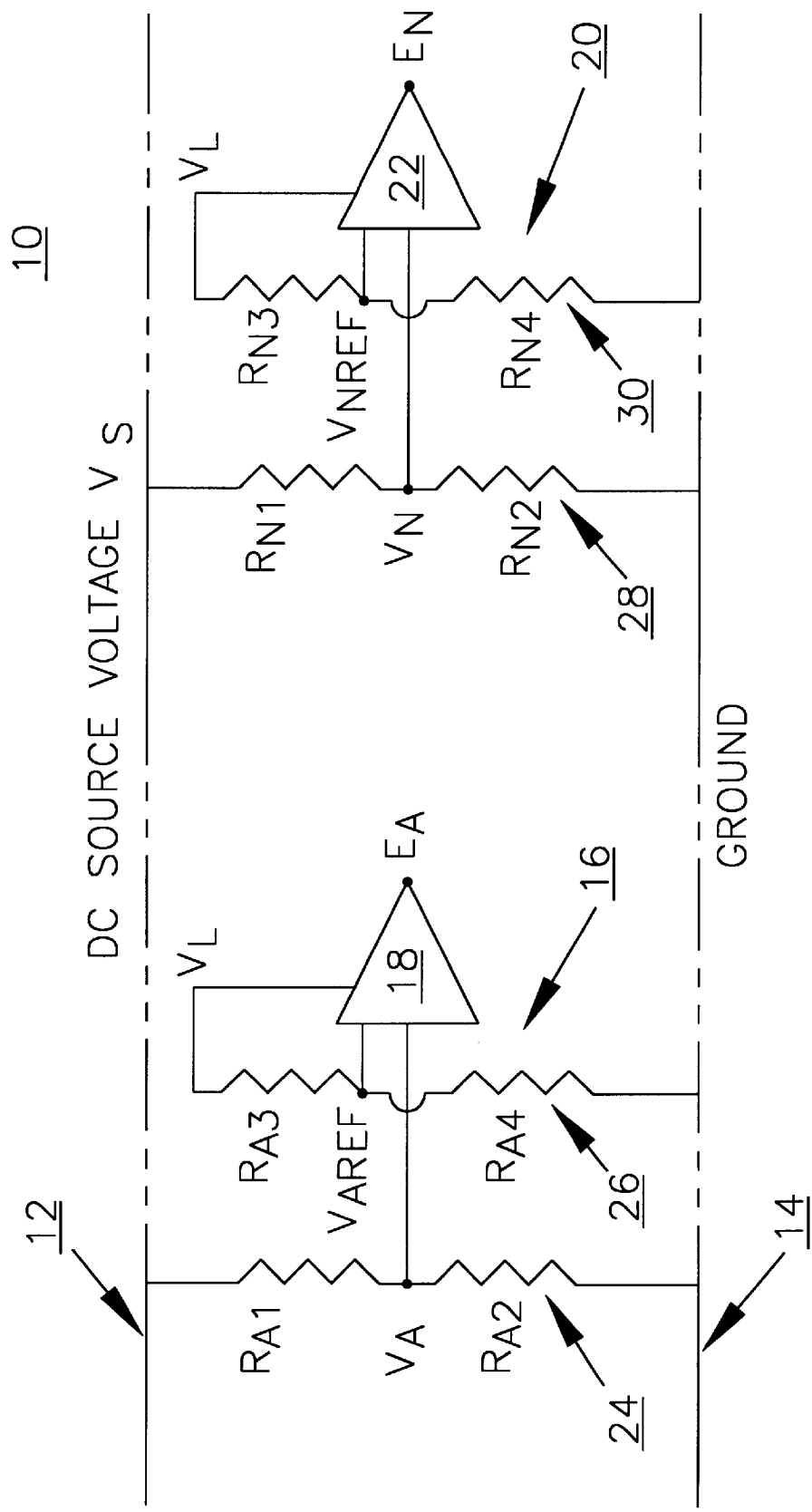
FIG. 3 is a schematic diagram of a multistage comparator circuit to determine bias voltage.

The invention tends to alleviate the problems of controlling a motor at fixed frequency by changing the frequency to provide an acceptable power level that the DC source voltage can apply. A simple multistage comparator circuit 10 which determines the controller bias voltage from the DC source voltage is shown in FIG. 3. Circuit 10 is connected to the DC voltage $V_S$ from the DC source on line 12, and is also connected to ground 14. The first stage 16 of circuit 10 includes a comparator 18 connected to a resistive network. The last (Nth) stage 20 includes a comparator 22 which is similarly connected to a resistive network, but the resistor values in each stage are selected to provide different bias voltages. Circuit 10 is designed to operate for a particular value of $V_S$, e.g. 200 V. A first voltage divider 24 formed of series resistors $R_{A1}$ and $R_{A2}$ in first stage 16 produces a first sample voltage $V_A$ at the resistor junction which is proportional to the supply voltage $V_S$. Since $V_A=V_S[R_{A1}/(R_{A1}+R_{A2})]$, the value of $V_A$ is determined by the relative values of $R_{A1}$ and $R_{A2}$. $V_A$ is applied to one input of comparator 18. Comparator 18 is powered by logic voltage $V_L$, e.g. +12 V. $V_L$ is also applied to a second voltage divider 26 formed of series resistors $R_{A3}$ and $R_{A4}$ to produce a first reference voltage $V_{AREF}$ at the resistor junction which is proportional to logic voltage $V_L$. Since $V_{AREF}=V_L[R_{A3}/(R_{A3}+R_{A4})]$, the value of $V_{AREF}$ is determined by the relative values of $R_{A3}$ and $R_{A4}$ which are selected to produce a selected reference voltage, e.g. +5.2 V. $V_{AREF}$ is applied to the other input of comparator 18. The output of comparator 18 produces a first bias voltage $E_A$ as will be further described below.

Similarly the Nth stage 20 includes a first voltage divider 28 formed of series resistors $R_{N1}$ and $R_{N2}$ connected to $V_S$ to produce an Nth sample voltage $V_N$, and a second voltage divider 30 formed of series resistors $R_{N3}$ and $R_{N4}$ connected to $V_L$ to produce an Nth reference voltage $R_{NREF}$. $V_N$ and $V_{NREF}$ are applied to comparator 22 to produce an Nth bias voltage $E_N$. The same resistor values may be used in voltage dividers 26, 30 to produce the same reference voltage in each stage since the reference voltage is an arbitrary value applied to each corresponding comparator 18, 22. However the resistors of the Nth stage are selected to produce a different sample voltage (based on the source voltage) since each stage will produce a different bias voltage. Between the first and last stages, there may be additional similar stages which produce different sample voltages which produce different bias voltages.

When the source voltage is at or near its desired value, e.g. 200 V, circuit 10 will produce the maximum bias voltage which produces the highest motor frequency. As the source voltage decreases, successive stages in circuit 10 produce lower bias voltages which produce lower frequencies so that the motor can operate efficiently. While the linear relationship of FIG. 2 provides an infinite number of operating points, a practical circuit will operate at a limited number of discrete points on the curve, e.g. point 40 at the maximum frequency, points 42 and 44 at intermediate frequencies, and point 46 at the minimum frequency. The frequencies at points 40–46 and the corresponding bias voltages which produce these frequencies are related to values of the source voltage. For example, at the nominal source voltage of 200 V, the maximum bias voltage and frequency are desired. Thus voltage divider 24 has resistor values so that $V_A$ is greater than $V_{AREF}$ while $V_S$ is close to 200 V, i.e. so that comparator 18 produces a maximum bias voltage signal. However, the resistor values are selected so that when the source voltage drops sufficiently, e.g. to 180 V, so that the operating point shifts to point 42, i.e. decreased bias voltage and frequency, then $V_A$ equals $V_{AREF}$, so that comparator 18 no longer determines the bias voltage but the comparator in the next stage takes control. Thus the voltage divider resistors in each circuit are selected so that as successive discrete operating points are reached, the bias voltage is determined by the next comparator until the final stage comparator produces the minimum bias voltage and frequency.

Figure 4A:
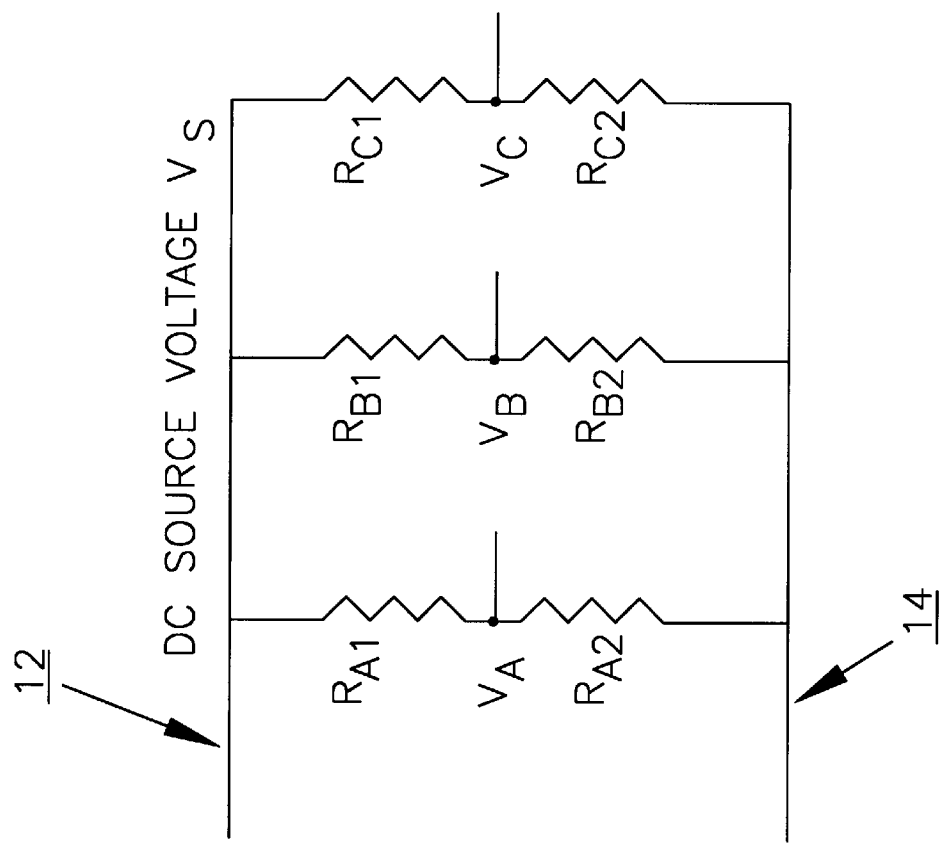
FIGS. 4A, B schematic diagrams of a three comparator circuit to determine bias voltage.

As an example, a three-stage circuit 32 as shown in FIGS. 4A, B was designed and built using three comparators 34, 36, 38. The circuit parameters are based on three predetermined DC source voltage (and power) levels below the nominal operating source voltage of 200 V, e.g. $V_A$, $V_B$, $V_C$ correspond to 180 V, 160 V, 140 V, respectively.

All of the comparators 34, 36, 38 are initially biased off, i.e. the sample voltages $V_A$, $V_B$, $V_C$ are above the reference voltages applied to the comparators when the source voltage is near the nominal voltage. The outputs of each comparator connect to the junctions of corresponding output voltage dividers formed of series resistor pairs $R_{A5}$–$R_{A6}$, $R_{B5}$–$R_{B6}$, $R_{C5}$–$R_{C6}$ which are connected between $V_L$ and ground. Thus while the comparators are biased off, the comparator outputs are determined by the output voltage dividers. Each divider is set to produce one of the selected bias voltages to produce the desired frequency necessary for a particular source voltage level. The comparator 34 voltage is the highest and comparator 38 voltage is the lowest. All comparator voltages are 'OR'ed through the three corresponding external diodes 40, 42, 44 to an output line 46 and form the bias voltage which controls the motor frequency. Diodes 40–44 isolate the comparators. The highest voltage applied to line 46 determines the bias voltage. As the DC source voltage decreases, below the cut off reference voltage to comparator 34, comparator 34 turns on (output is grounded), effectively removing that voltage from the diode network. Comparators 36, 38 are still off so comparator 36 now determines the bias voltage. As the DC source voltage decreases further, comparator 36 is also turned on, effectively removing that voltage from the diode network. Comparator 38 is still off so it now determines the bias voltage. As the DC source voltage decreases even further, comparator 38 also turns on, effectively removing that voltage from the diode network. This corresponds to the minimum bias voltage, e.g. 0 V, and the lowest frequency.

Figure 4B:
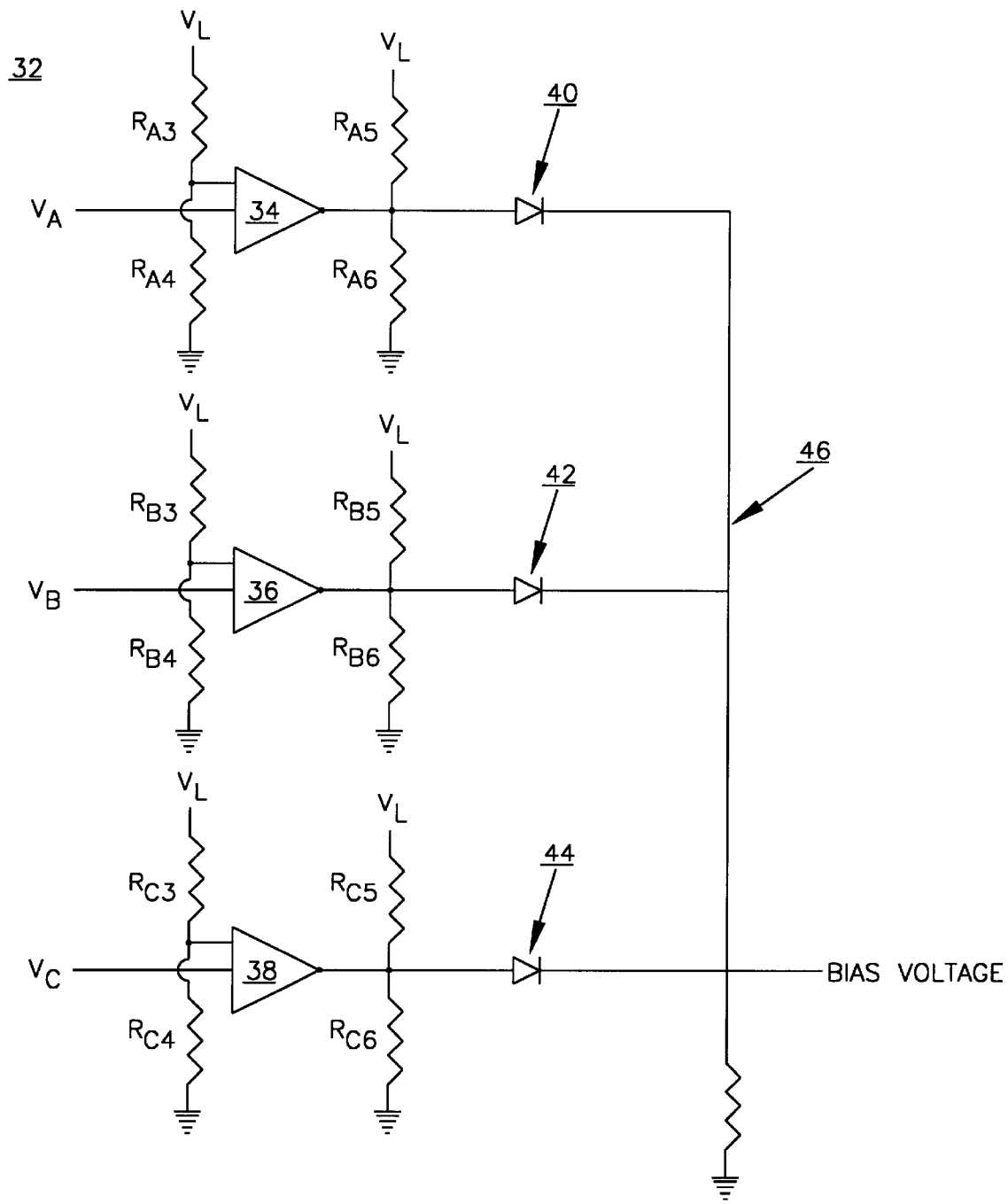
Figure 5:
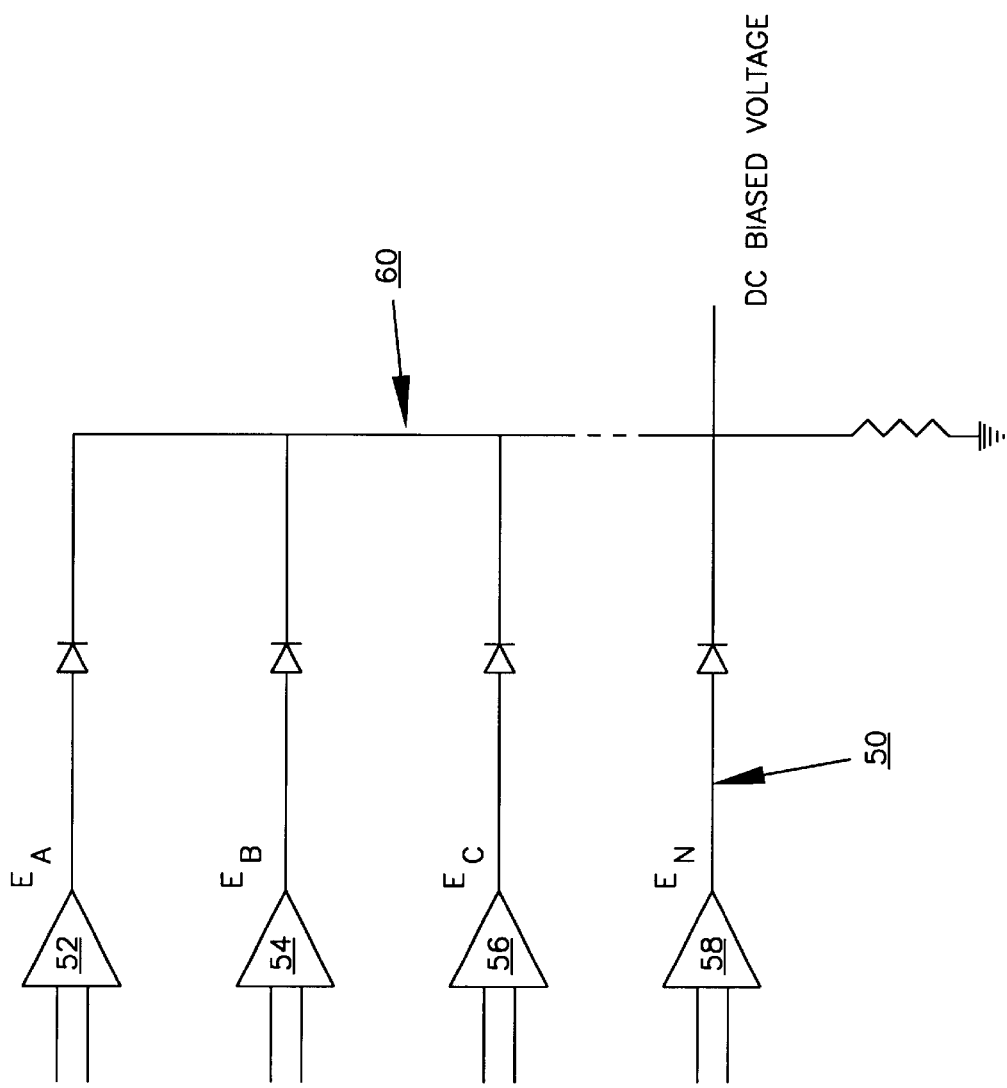
FIG. 5 is a simplified schematic diagram of a multistage comparator circuit.

More generally, a voltage divider network similar to that shown in FIGS. 3, 4A is developed across the DC source voltage which has a nominal voltage $V_S$. The reduced (or sample) voltage produced by the voltage divider network is compared to a reference voltage in a multistage comparator circuit 50, shown very schematically in FIG. 5 and similar to that shown in FIGS. 3, 4B, in which the first comparator 52 produces a related output voltage $E_A$ which is the maximum bias voltage. When the DC source voltage drops below a first predetermined voltage level, the comparator 52 voltage $E_A$ changes, i.e. drops to essentially zero voltage. The second comparator 54 has a voltage $E_B$ associated with its output and is less than $E_A$, and third through Nth comparators 56, 58 have successively lower outputs ($E_A > E_B > E_C > E_N$). By establishing predetermined DC source voltage levels and comparing to fixed comparator voltage levels, the $E_A$ to $E_N$ levels can be "OR"ed on output line 60. Now the highest bias voltage or frequency is determined by comparator 52 with comparators 54, 56 setting intermediate bias voltages or frequencies. Comparator 58 controls the minimum frequency when its reference voltage causes comparator 58 to turn on. The end result is a DC bias voltage which is a function of source voltage and provides maximum power to the motor for a given DC bias voltage. A limited number, e.g. 3 or 4 levels of bias voltage, will typically be used, with each level having a specific frequency response. The invention is not limited to a specific number of bias steps, but an infinite number of steps can be achieved. However, a practical circuit may only require 3 or 4 steps, e.g. a circuit designed for an AC motor control where the motor inertia will not respond to an infinite number of steps.

An extension of this invention is used to provide a cutout voltage or shutdown voltage, as illustrated by shut off circuit 6 in FIG. 1. An additional comparator is used to sense the minimum bias voltage that is allowed to the motor control circuit. When the source voltage falls below the critical voltage level, the comparator changes state and the output shuts down the motor drive circuit. The shut off comparator is configured similarly to those previously described and illustrated in FIGS. 3–5 but the output is not connected to the bias voltage line but is separately connected to the converter. The shut off comparator makes the frequency go to zero but does not shut off the DC power to the converter.

Figure 6B:
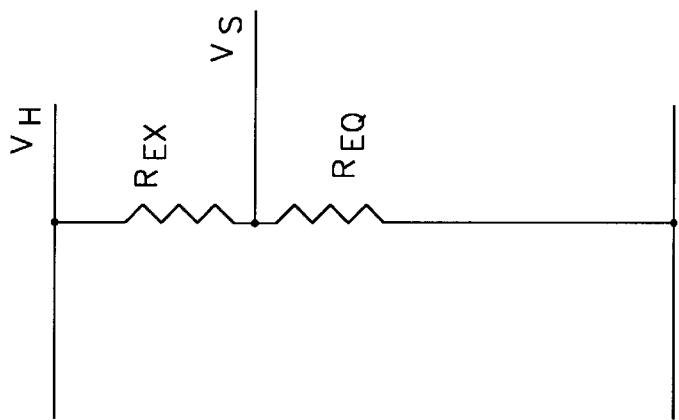
FIG. 6B is a simplified equivalent resistor representation.
Figure 6A:
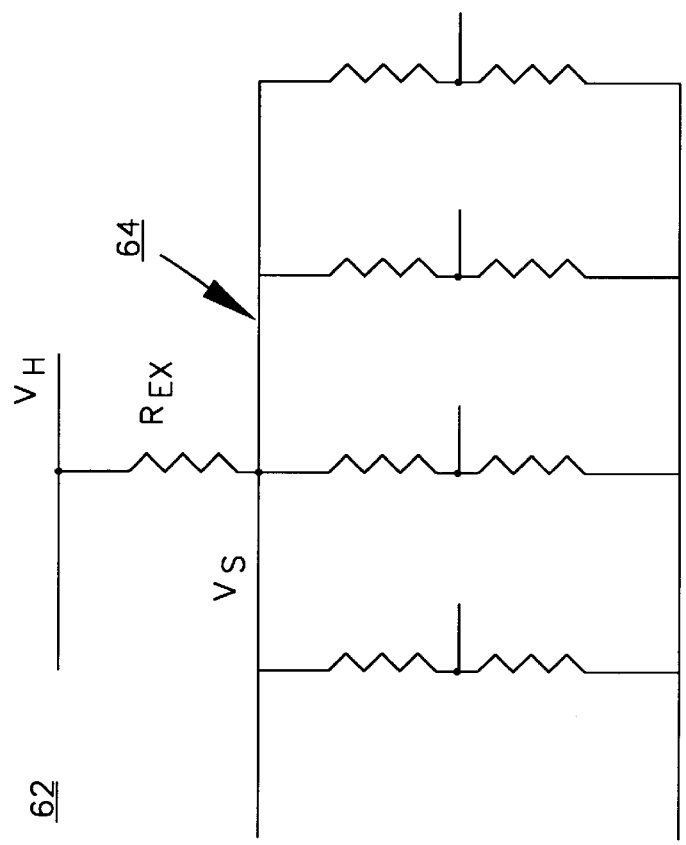
FIG. 6A is a schematic diagram of a voltage divider network designed for one voltage level connected to a higher voltage level source through a dropping resistor.

This invention is not restricted to a fixed DC source voltage, rather it can accept higher voltages without requiring new sensing comparators. For example, the bias resistor network, resistor values and voltage detect levels can be established for a 200-volt bias system. Min-max frequencies can be established by setting voltage points on the DC bias curve. If voltages greater than 200V need to be applied, for example 300V, then a dropping resistor is used to re-establish the 200V level to the sense resistors, as shown in FIG. 6A. The system 62 which operates from a voltage source $V_H$ is built upon a voltage divider network 64 designed to operate from a nominal DC voltage source $V_S$ as previously described, where $V_H > V_S$. The voltage divider network 64 is reduced to an equivalent resistor $R_{EQ}$ for calculating an "R external" $R_{EX}$ necessary for the various high voltage sources, as shown in FIG. 6B. This method can be used for any given voltage level; however, the practicality of using voltages in excess of 1000V may be somewhat limited. This method has been used for voltages up to 750V which can be obtained from solar arrays.

Changes and modifications in the specifically described embodiments can be carried out without departing from the scope of the invention which is intended to be limited only by the scope of the appended claims.

What is claimed is:

1. Apparatus for converting DC power from a DC source to AC power for an AC load, comprising:
   a converter which produces an AC output from a DC input;
   a bias control circuit connected from the DC source to the converter to provide a bias voltage to the converter for controlling the frequency of the AC output of the converter, the bias control circuit being responsive to the DC voltage from the DC source to produce the bias voltage.

2. The apparatus of claim 1 wherein the bias voltage is related to the AC output frequency by a predetermined function over a frequency range determined by the load.

3. The apparatus of claim 1 wherein the bias control circuit changes the bias voltage at selected DC source voltages below a nominal design voltage.

4. The apparatus of claim 1 wherein the bias control circuit provides different bias voltages between a maximum bias voltage and a minimum bias voltage at a plurality of discrete DC source voltages.

5. The apparatus of claim 1 wherein the bias control circuit comprises a multistage comparator circuit.

6. The apparatus of claim 5 wherein the multistage comparator circuit comprises:
   a plurality of comparators, each comparator having a first input connected to a reference voltage;
   a resistive network connected to a second input of each comparator, the resistive network producing a sample voltage at each input which is proportional to the DC source voltage.

7. The apparatus of claim 6 wherein each comparator is off until the sample voltage at the first input decreases to a value equal to the reference voltage at the second input, the sample voltage required to turn on each successive comparator being proportional to a selected decreased DC source voltage from a nominal design source voltage.

8. The apparatus of claim 7 wherein the outputs of the comparators are "OR"ed on a bias voltage output line connected to the converter, the output of each comparator being at a selected bias voltage when each comparator is off and going to zero when each comparator is turned on.

9. The apparatus of claim 7 further comprising a dropping resistor connected to the resistive network for connecting the resistive network to a DC voltage source producing a higher source voltage than the nominal design source voltage.

10. The apparatus of claim 1 further comprising a shut off circuit connected to the drive for shutting off the drive when a minimum DC source voltage is reached.

11. The apparatus of claim 1 wherein the converter is a programmable pulse width modulated motor drive.

12. A system comprising:
   a DC source;
   a converter connected to the DC source to produce an AC output from a DC input;

a bias control circuit connected from the DC source to the converter to provide a bias voltage to the converter for controlling the frequency of the AC output of the converter, the bias control circuit being responsive to the DC voltage from the DC source to produce the bias voltage;

an AC load connected to the AC output of the converter.

13. The system of claim 12 wherein the bias voltage is related to the AC output frequency by a predetermined function over a frequency range determined by the load.

14. The system of claim 12 wherein the bias control circuit changes the bias voltage at selected DC source voltages below a nominal design voltage.

15. The system of claim 12 wherein the bias control circuit comprises a multistage comparator circuit.

16. The system of claim 15 wherein the multistage comparator circuit comprises:

a plurality of comparators, each comparator having a first input connected to a reference voltage;

a resistive network connected to the DC source and to a second input of each comparator, the resistive network producing a sample voltage at each input which is proportional to the DC source voltage;

wherein each comparator is off until the sample voltage at the first input decreases to a value equal to the reference voltage at the second input, the sample voltage required to turn on each successive comparator being proportional to a selected decreased DC source voltage from a nominal design source voltage;

wherein the outputs of the comparators are "OR"ed on a bias voltage output line connected to the converter, the output of each comparator being at a selected bias voltage when each comparator is off and going to zero when each comparator is turned on.

17. The system of claim 16 further comprising a dropping resistor connected to the resistive network for connecting the resistive network to a DC voltage source producing a higher source voltage than the nominal design source voltage.

18. The system of claim 12 wherein the DC source comprises a photovoltaic solar array and the AC load comprises a water pump.

19. A method for powering an AC load from a DC source, comprising:

obtaining DC power from the DC source;

converting the DC power to AC power;

matching AC load requirements to the DC source by controlling the frequency of the AC power as a function of the DC source voltage;

delivering the AC power to the AC load.

20. The method of claim 19 wherein the frequency of the AC power is controlled by first determining a relationship between the AC frequency and a bias voltage applied to a converter for converting the DC power to AC power, and then determining a bias voltage from the DC source voltage as the DC source voltage changes to a series of voltage levels below a nominal design voltage depending on the power requirements of the load, and then applying the bias voltage to the converter to change the frequency of the AC power delivered to the load to better match load requirements.

* * * * *